United States Patent [19]

Lindblad

[11] 3,942,820
[45] Mar. 9, 1976

[54] SAFETY BELT FOR VEHICLES

[76] Inventor: Oskar Lennart Lindblad, Hedasgatan 16, 440 20 Vargarda, Sweden

[22] Filed: Aug. 2, 1974

[21] Appl. No.: 494,189

[30] Foreign Application Priority Data
Aug. 13, 1973 Sweden .............................. 7311025

[52] U.S. Cl. .......................................... 280/150 SB
[51] Int. Cl.² ........................................... B60R 21/10
[58] Field of Search ............... 280/150 SB; 297/389; 180/82 C

[56] References Cited
UNITED STATES PATENTS
3,414,326  12/1968  Raffaelli ........................ 280/150 SB
3,779,578  12/1973  Spahl ............................. 280/150 SB Primary Examiner—Robert R. Song
Attorney, Agent, or Firm—Ulle C. Linton

[57] ABSTRACT

Safety Belts for vehicles capable of being positioned in front of a rider on one of the vehicle seats and having parts of the belts which can be temporarily stiffened near to at least one anchoring point thereof and means for guiding said stiffened belt portions at said anchoring points.

13 Claims, 12 Drawing Figures

SAFETY BELT FOR VEHICLES

The present invention relates to safety belts for vehicles, in the first place so called passive safety belts, but it may possibly have an application in some form in connection with other types of safety belts.

It is a principal object of the invention to provide a safety belt, which can be brought from an inactive to an active position and vice versa without any complicated means of transportation of different kinds.

This object is reached by means of a safety belt made in accordance with the invention and substantially characterized by exhibiting for one thing means for temporary stiffening of the portions of the safety belt located nearest to one or several anchoring points thereof and for another means for directional guiding of said stiffened belt portions at the anchoring points in question.

In the following a few examples of embodiments of the objects of the invention will now be described with reference to the accompanying drawings, in which FIG. 9 is a cross sectional view through a part of the belt of the safety belt assembly in the stiffened condition of said part.

Figure 1:
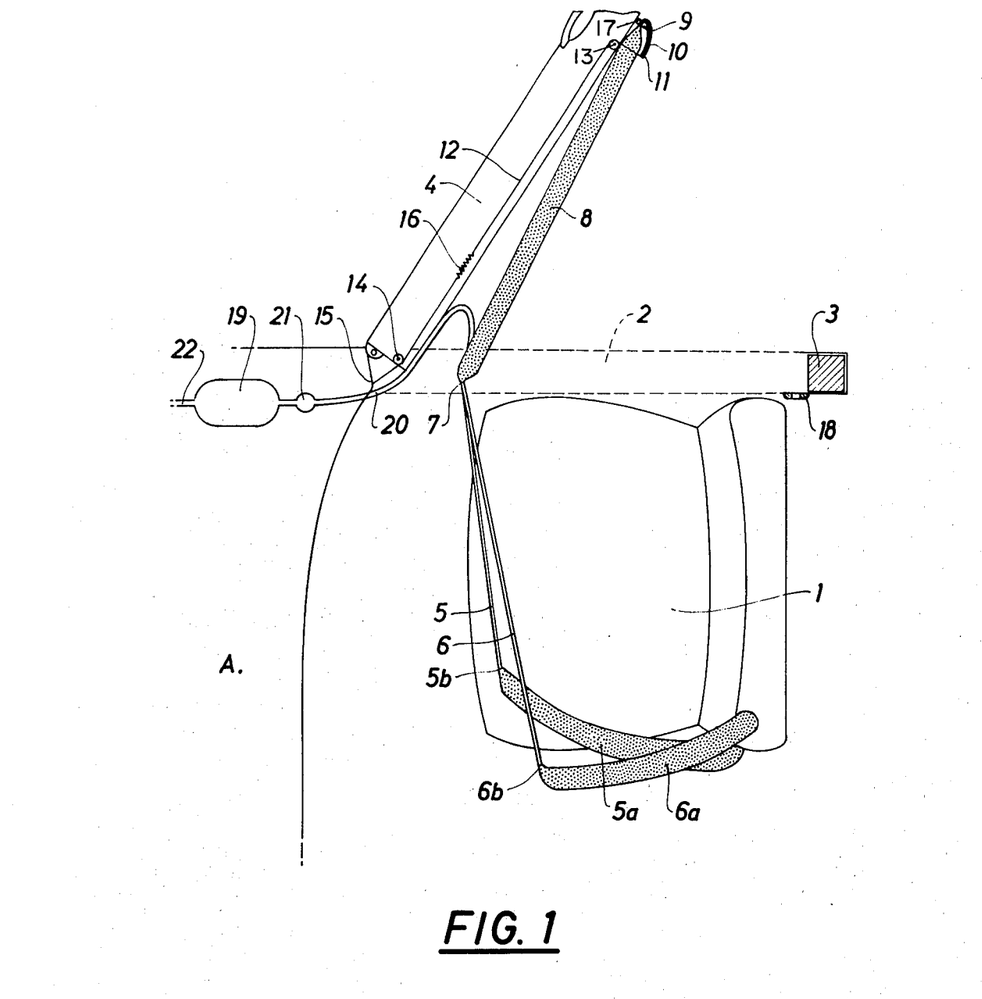
FIG. 1 is a top view of a seat of a vehicle equipped with a mounted safety belt according to the invention, the door of the vehicle being open and the safety belt being in inactive position.

In FIG. 1 a vehicle is illustrated, in which a safety belt according to the invention is mounted, the seat of the vehicle being indicated with 1, the doorstep with 2, the rear doorpost with 3, the door with 4, and the instrument panel with A.

Figure 7:
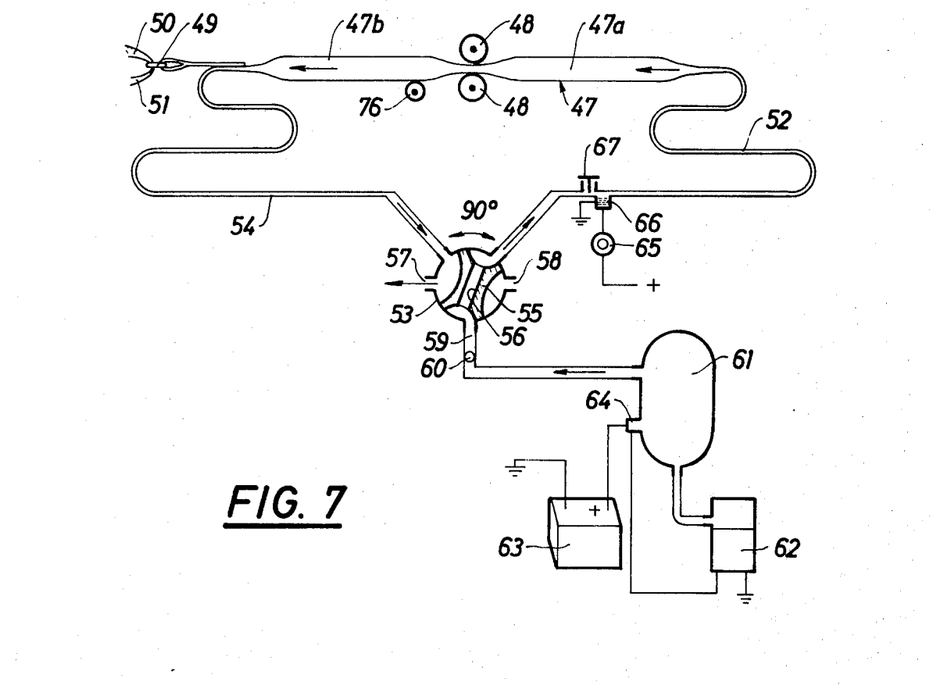

The safety belt illustrated in FIG. 1 for one thing in its entirety exhibits a chest belt part 6 and for another a belt part 5, which two belt parts at the point 7 are connected with a third belt part 8 by way of example via a sliding knot in such a way that the belt parts 5 and 6 in sliding manner are threaded through said knot, which is firmly supported by the belt part 8. The waist belt part 5 can suitably be fastened to the seat 1 of the vehicle at a low point of the same or to the car body near its floor, and the waist belt part 6 in the example of embodiment illustrated is fastened to the backrest of the vehicle. The belt part 5 as well as the belt part 6 can be fed in and out respectively of a collecting means mounted on their fastening ends. In the same manner the belt part 8 can be fed in and out respectively of a collecting device provided on the door. The devices for this control will be described more in detail in connection with the description of FIGS. 7–12. The portions 5a and 6a respectively of the belt parts 5 and 6, which occupy a position nearest to the fastening points, suitably consists of a belt material, which is woven or otherwise made in the shape of an airtight hose. In empty condition this hose is flat and then functions as a conventional band in a safety belt. By in suitable manner sealing one end of the hose belt portion and by blowing in compressed air through the other end, the hose will stiffen and will occupy the position illustrated in FIG. 1. The belt part 8 is made in the same way in the shape of a hose. In order to keep the belt part 8 in the forwards pointing position along the door, a supporting arm 10 is provided at the rear edge of the door, which arm is pivotable round a hinge 9 and at its free end supports a supporting roller 11, which can bear against the hose 8. The pivoting arm 10 via a pulling wire 12 laid over two pulley wheels 13 and 14 mounted on the door is in connection with the doorpost at the point 15. In order to obtain a certain compensation of th stresses, a portion of the wire 12 comprises a tension spring 16. When the door 4 from a closed position is opened up towards the position illustrated in FIG. 1 and the hose belt portion 8 is in expanded, i.e. stiff condition, the pulling wire or the guiding wire 12 is stretched and brings the supporting roller 11 to bear against the hose belt portion 8 tending to pivot the same in direction towards the door. In order to lessen the load on the door, when the safety belt is in use, with respect to the forces, which may arise in connection with a very sharp deceleration or a collision, an anchor pin 17 is mounted on the door near to the point of attachment to the same of the part 8, which pin 17 in closed position of the door is engaging a hole for a seat armature 18 on the doorstep corresponding said anchor pin. This armature can of course also be provided on the doorpost 3. At the end of the part 8 directed away from the point of attachment the interior of said part 8 is in communication with a tank containing a pressure medium via a flexible hose 20. In the path of communication between the pressure medium tank 19 and the belt portion 8 a pressure control valve 21 has been introduced. The hose 20 can of course also serve the purpose of evacuating the belt portion 8. The belt part 8 can be evacuated through hose 20 in the same way as the belt part 47b in FIG. 7 is evavuated through the hose 54 when the control valve 21 is in the same position as the control valve 53. Via a duct 22 the pressure medium tank 19 is in communication with a compressor and possibly with some kind of a vacuum pump. The belt portions 5a and 6a can be attached to the other parts of the belts 5 and 6 respectively by sewing, the belts 5 and 6 being of conventional kind. However, it is also possible to make the entire belts 5 and 6 of hose shaped material, which is sealed at the points 5b and 6b by way of example by welding. The belt portions 5a and 6a can also be rigidly attached at their rear ends, which does not permit them to be fed in, as was mentioned earlier.

Figure 2:
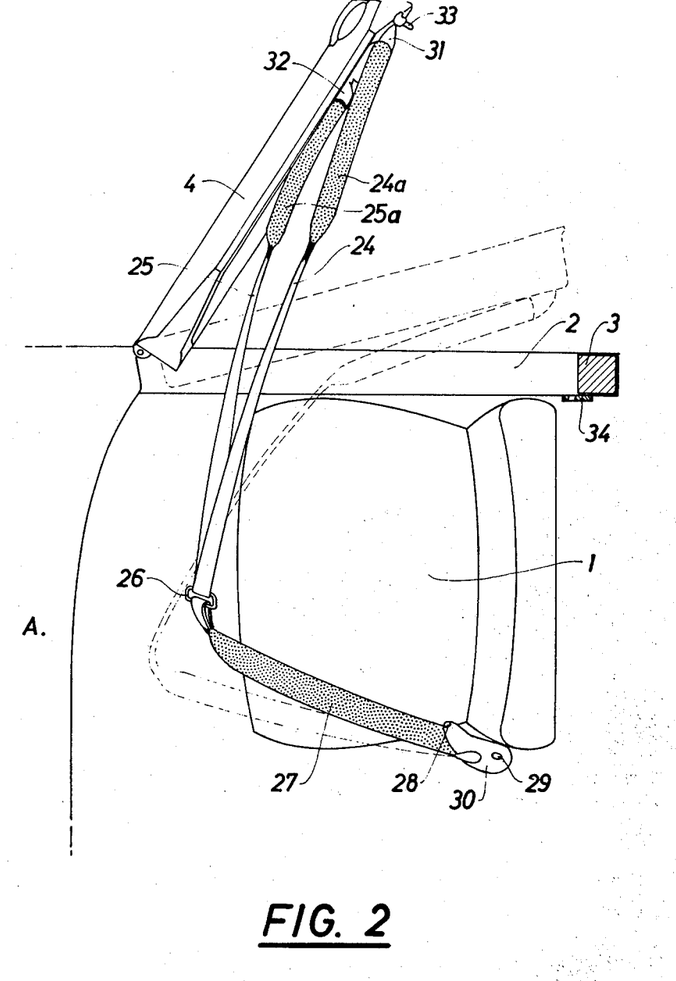
FIG. 2 is a corresponding view of a vehicle seat with a mounted safety belt according to a second embodiment.
Figure 3:
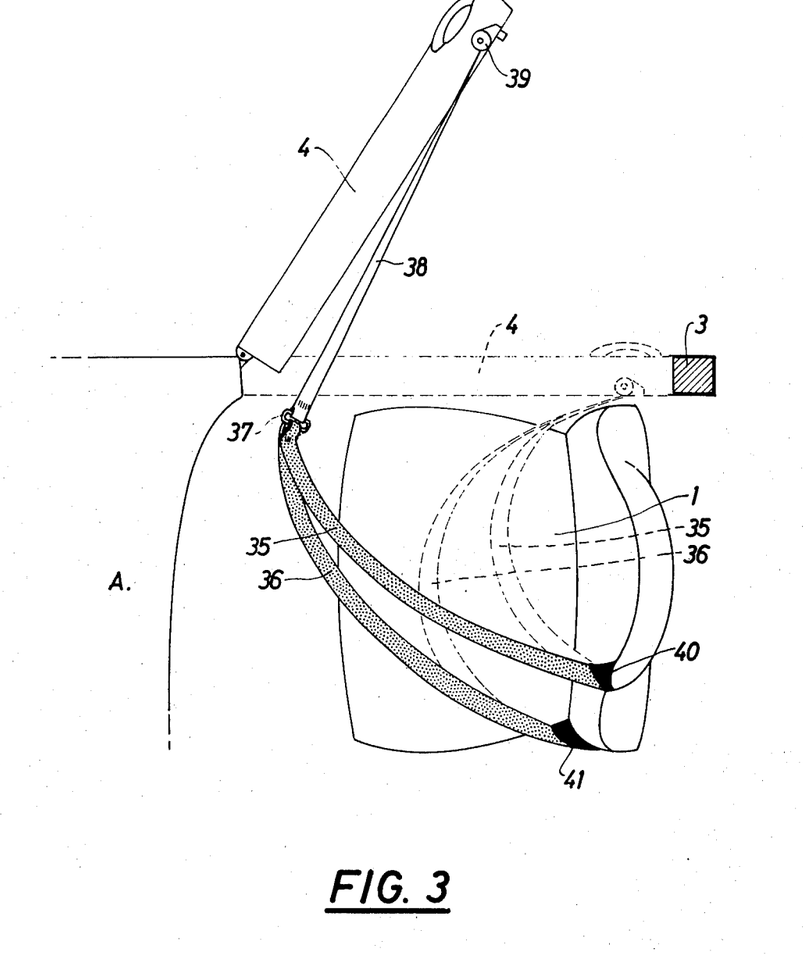
FIG. 3 is a corresponding top view of a seat of a vehicle equipped with a safety belt according to a third embodiment of the invention.

The safety belt illustrated in FIG. 2 as in a principle is the reverse of the safety belt shown in FIG. 1, i.e. the safety belt exhibits two belt parts 24 and 25, which can be fed in into the door 4 of the vehicle and in sliding arrangement be threaded through a sliding knot 26, which in its turn is attached to the front end of a belt part 27, which at the rear can be fed into the seat or for example onto a roller. For the directional guiding of the belt part 27 a support roller 28 is incorporated into the assembly, said roller 28 being journalled on a supporting arm 30 pivotable around a hinge 29, which supporting arm suitably is anchored to the seat or the floor of the vehicle. In the last mentioned embodiment the infeed openings 31 and 32 in the door are provided with means, which form fixed supports for the hose shaped belt parts 24a and 25a respectively in the expanded condition of the last mentioned ones, whereby they are given a desired directional guiding. In order to compensate the pulls in the upper belt part 24, i.e. the chest belt, an anchor pin 33 is provided at the upper edge of the door, which pin cooperates with a socket 34 provided in the upper portion of the door post and exhibiting a hole corresponding said pin 33. An anchor pin corresponding to the one illustrated in FIG. 1 is suitably provided at the bottom edge of the door. The supporting arm 30 is suitably spring loaded in direction away from the door of the vehicle, but it can also be rigidly anchored to the seat or to the floor without departing from the fundamental idea of the invention. The safety belt illustrated in FIG. 3 is turned in the same direction as the one illustrated in FIG. 1, i.e. with only one belt part attached to the door of the vehicle. This safety belt exhibits hose shaped chest-and waist belt parts, which extend all the way up to a loop or so called Y-point 37, to which one end of a belt portion 38 of the safety belt is connected, which belt portion 38 can be wound up on a roller 39 provided on the door, and said roller 39 can be of conventional kind. The roller 39 can suitably be driven by spring force, electrically, by vaccum, or by air pressure. It is also possible to substitute the roller 39 with a tension spring provided with a blocking mechanism and mounted on the door. The door 4 in its closed position is indicated with broken lines. In said position the belt part 38 is collected on the roller 39, and the safety belt is in active condition. The supports 40 and 41 serve the purpose of directional guiding of the belt parts 35 and 36. The belt parts 35 and 36 can suitably be designed to permit being fed in and out respectively of collection devices arranged at the rear.

Figure 4:
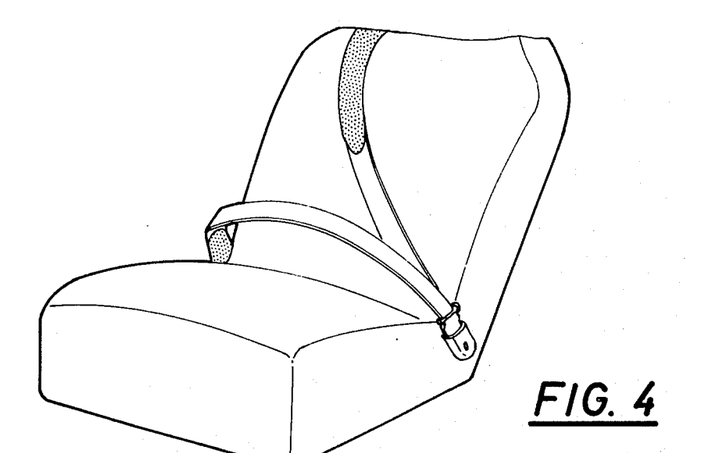
FIG. 4 is a perspective view of a seat of a vehicle equipped with a safety belt according to a fourth embodiment, the safety belt being exhibited in active position.
Figure 5:
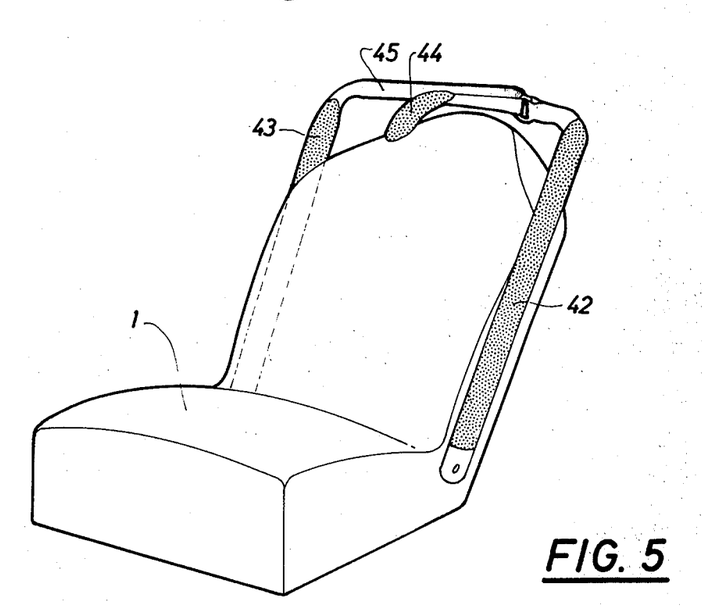
FIG. 5 is a corresponding perspective view of the safety belt of FIG. 4 in inactive position, i.e. in taken off condition.
Figure 6:
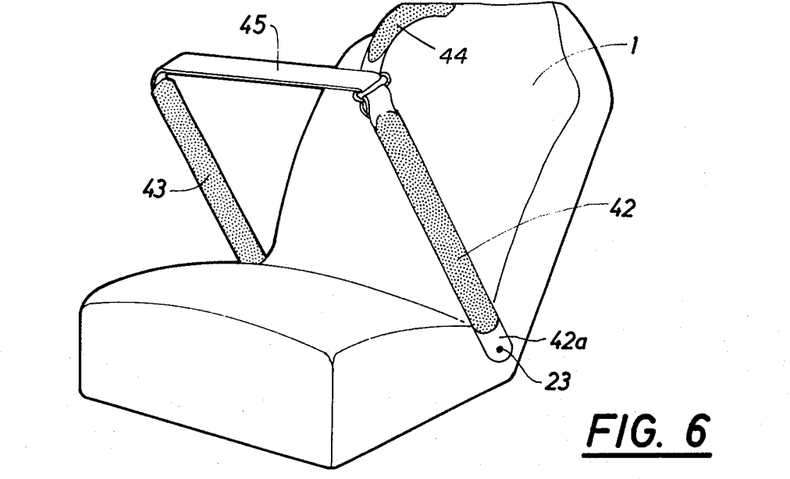
FIG. 6 illustrates the same safety belt in a taking off phase and a putting-on phase respectively, FIG. 7 schematically shows a control means forming part of the safety belt system, FIG. 8 on an enlarged scale shows a detail forming part of FIG. 7.

The safety belt illustrated in the FIGS. 4–6 like the previously described safety belts exhibits three hose shaped belt parts, which can be stiffened by inflation, all of said belt parts however being fastened to the seat of the vehicle, two of which 42 and 43 at laterally located points below the very seating plane, the remaining one being fastened with one end to a point at the top of the backrest, and all of said belt parts, which can be stiffened, designed to permit being fed in at their points of attachment. The attachment end of the upper belt part 44 is located somewhat beside the centre of the backrest and its outer end is connected with the belt part 43 by means of a band 45, which in sliding mounting is threaded through a loop 46, which is supported by the front end of the belt part 42. The belt part 42 in its lower portion is directionally guided by means of a guide 42a, which can be vertically pivoted round a shaft 23. The belt part 43 is attached to the other side of the seat in the same manner. The belt portions 42 and 43 are retractable into the seat via two rollers (not shown) which are behind the guide elements of which element 42a is shown, like the rollers 48 of FIG. 7. In the inactive position of the safety belt illustrated in FIG. 5 the belt parts 42 and 43 are fully fed out and extend vertically along the backrest, so that they are not in the way of a person, who wants to occupy the seat. When taking on the safety belt, the belt parts 42 and 43 are pivoted forwards, whereby the belt part 44 passes the head of the person in question at one side thereof and is laid over the user's chest, when the belt parts 42 and 43 are fed in to the active position of the safety belt illustrated in FIG. 4, in which position the belt part 45 is bearing against the hip of the person.

Figures 8, 9:
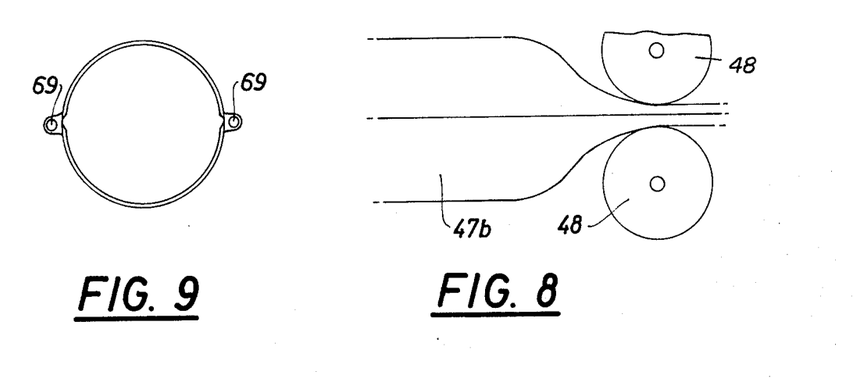
Figure 10:
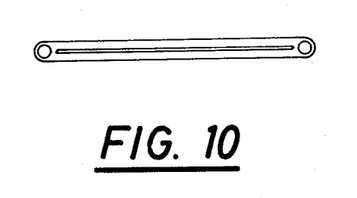
FIG. 10 is a corresponding cross sectional view of the same belt part in a flexible condition of said part, FIG. 11 schematically illustrates another type of the control means of the safety belt.
Figure 11:
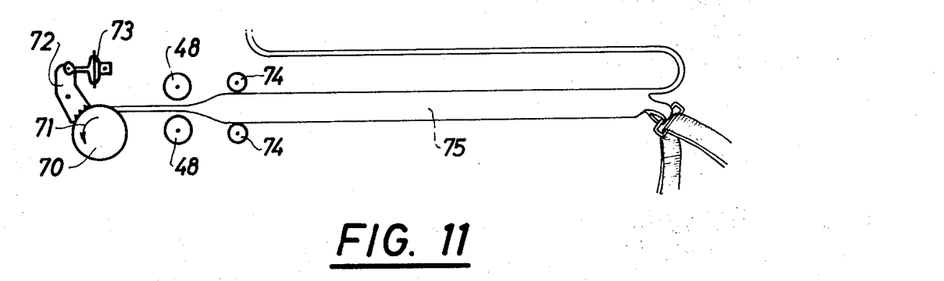
Figure 12:
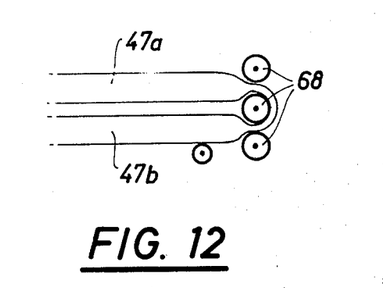
FIG. 12 shows an example of an arrangement, which makes possible a deflection up to 180° of the portion of the safety belt, which can be stiffened.

The in-feed mechanism illustrated in FIG. 7 can be used in anyone of the embodiments disclosed in the foregoing figures. In FIG. 7 a hose shaped belt part 47 is carried between clamping rollers 48, which thus form a strangulation between the spaced filled with pressure medium in the two parts 47a and 47b of the belt part 47. A sliding knot attached to the belt part 47 is indicated with 49, and the two other belt parts 50 and 51 entering into the safety belt assembly are threaded through the same. Said belt parts may for example be the chest and waist parts. The hose portion 47a via a flexible duct 52 is in communication with a valve housing 53 of circular shape, in which housing also another duct 54 has its orifice, which duct 54 estabishes communications between the valve housing and the end of the hose portion 47b, which is pointing away from clamping rollers 48. A valve body 55 substantially exhibiting the shape of a H is pivotably mounted in the valve housing 53, said body 55 exhibiting a central bore 56 extending in the vertical direction of the H. The orifices for the ducts 52 and 54 in the valve housing 53 are displaced in between them at an angle of 90°, and with a displacement of 45° counted from the orifice of the duct 54 a discharge opening 57 is provided in the valve housing, and in opposite direction with a displacement of 45° counted from the orifice of the duct 52a a second discharge opening 58 is provided, and with still another displacement relative to the discharge openings 57 and 58 an infeed duct 59 intended for a pressure medium is provided, in which duct a control valve 60 is mounted. The duct 59 communicates with a tank 61 with compressed air, which is fed with pressure medium, preferably air, by means of the preferably electrically driven air compressor 62. The compressor can of course also be driven by other means, if so deemed suitable. A battery 63 is switched in into the circuit of the aircompressor by a pushbutton switch 64 connected with the air tank 61. In the position of the valve body 55 illustrated in the drawing, pressure medium is fed in into the hose portion 47a, while the hose portion 47b is de-aired via the outlet 57. By this an inflation and stiffening of the belt parts 50 and 51 is obtained. In this condition the belt part 47b is slack and comparatively comfortable for the person using the safety belt. If the valve body 55 is turned about 45° in counter-clockwise direction the hose portion 47b instead will get in communication with the pressure medium tank 61 via the ducts 59 and 54, while the hose portion 47a is de-aired via the outlet 58. By this a prolongation of the hose portion 47b is obtained at the same time as also this portion is inflated and stiffened in the manner described in connection with the foregoing figures. The directional guiding of the hose portion 47b is arranged by means of a supporting roller 76. When the valve body 55 is turned to a position, in which the bore 56 is substantially horizontal, the ducts 52 and 53 communicate with each other, but not so with the pressure medium tank 61. The valve body can also occupy a position, in which all the communications are interrupted. It is of course possible to combine the device with a blocking means in order to lock the hose shaped portion 47 of the belt in a desired stretching position. This blocking means may for example be connected with the clamp rollers 48. A switch 65 is provided to initiate the ignition of a pressure generating means 66, preferably operating in the form of a powder charge, when abnormally great changes in the speed of the vehicle is taking place, which for example occurs in connection with a collision, said means 66 then rapidly increasing the pressure in the hose portion 47a. By a suitable choice of the distance between the clamping rollers 48 and consequently the strangulation of the belt part 47 between said rollers a suitable dampening of the inflation and stiffening of the safety belt is obtained. In normal use of the safety belt, the valve body 55 is in the position illustrated in the drawing, i.e. there is constantly a certain overpressure in the hose portion 47a keeping the safety belt under the right tension. The tension of the safety belt can be regulated by in a suitable manner adjusting the valve indicated with 67, which suitably is made with constant throughflow, but which can be completely opened at an overpressure. It is suitable to make the pressure generating means 66 as a pyrotechnic charge, but it is of course also within the scope of the invention to use other types of pressure generating means. With the arrangement illustrated in FIG. 12 with respect to the pulley wheels 68, one can obtain a bend of up to 180° of the hose shaped belt portion 47. This by way of example can be of importance, when one desires to introduce the hose portion 47a into the door of the vehicle. In the FIG. 8 the portion of the belt part 47 located to the left of the clamping rollers 68 is illustrated on an enlarged scale. When one desires to wind up the portion of the belt corresponding the hose portion 47a on a conventional wind-up device, it is suitable to design the hose as is shown in FIG. 9. The hose illustrated in FIG. 9 exhibits two longitudinal channels 69 defined by stiff walls, which channels are not compressed neither during their passage between the clamping rollers 48 nor when wound up on the roller of the wind-up device. In wound-up condition or when passing between the pulley wheels, the belt part in question occupies the position illustrated in FIG. 10, from which figure it is evident that the passage through the hose is quite substantially strangled. In connection with a strong pull of the belt portion 47b to the left according to FIG. 7 a certain out-feed is taking place, the dampening of which being determined by the strangulation between the clamping rollers 48. A wind-up device 70 is illustrated in FIG. 11, on which device the portion of the hose shaped belt part located inside the clamping rollers 48 can be wound up in the direction of the arrow 71. In order to make possible a locking of the wind-up device a locking arm 72 is schematically hinted in the drawing, which arm can be operated by means of an activation device actuated by vacuum, compressed air or magnetic force. The supporting rollers 74 serve the purpose to keep the hose shaped belt portion 75 in the desired direction. It is of course also possible at the same time as one applies an overpressure at one side of the clamping rollers 48 in the belt part 47 to apply an underpressure in the hose portion located in opposite position of the clamping rollers in order to increase the force operating upon the safety belt or the motion speed. By letting the clamping rollers 48 be actuated by means, which sense the weight of the traveller the dampening of the pull of the belt can easily be automatically adjusted by variation of the gap between said clamping rollers. It is also possible to obtain an inflation and stiffening of the belt for example in connection with a deceleration by letting the brake pedal simultaneously actuate a pressure increasing or a pressure reducing valve depending upon on which side of the clamping rollers one desires the actuation to take place. This actuation can also be reinforced by applying a vacuum on one side and an overpressure on the other side of the clamping roller as mentioned above.

I claim:

1. Safety belts for vehicles comprising a vehicle, a safety belt being connected to anchoring points on vehicle and having belt portions of a hose like configuration capable of being expanded by a pressure medium, valved means capable of supplying a pressure medium to said belt portions, means for the directional guiding of said belt portions, and clamping means capable of squeezing said belt portions at given points.

2. Safety belt as claim in claim 1 wherein each hoselike belt portion has at least one flexible pressure medium channel extending longitudinally of said belt portions which channels tend to resist deformation with respect to their crosssectional configuration.

3. Safety belt as claimed in claim 1 wherein at least one of said anchoring points in on a door of said vehicle.

4. Safety belt as claimed in claim 3 wherein said clamping means is capable of guiding at least one of said belt portions, towards said door upon the opening of said door relative to said vehicle.

5. Safety belt as claimed in claim 1 wherein said clamping means are arranged at least on one of said anchoring points and capable of pivoting around a substantially vertical shaft.

6. Safety belt as claimed in claim 1 wherein said directional guiding means comprising at least two horizontal shafts connected to said vehicle anchoring points and means connected to said belt portions and pivotally mounted on said shaft.

7. Safety belt as claimed in claim 1 wherein said valved means includes a regulation valve arranged to create a difference in pressure on said belt portions on two sides of said clamping device.

8. Safety belt as claimed in claim 7 wherein said valve is capable of connecting one of said belt portions on one side of said clamping means with said pressure medium and the belt portion on the other side of said clamping means with the atmosphere.

9. Safety belt as claimed in claim 7 wherein said valve is capable of bringing the belt portions on opposite sides of said clamping device, into communication with each other and discontinuing their communication with said pressure medium.

10. Safety belt as claimed in claim 7 wherein said regulation valve comprises a valve housing having a circular cross-section with a plurality of peripherically located connection openings and a valve member located in said valve housing which valve member is capable of selectively maintaining and interrupting communication between said connection openings.

11. Safety belt as claimed in claim 10 wherein said valve member has a substantially H-shape configuration.

12. Safety belt as claimed in claim 7 including means capable of feeling abnormal changes in the motion of said vehicle and increasing the pressure of said pressure medium to counteract the pulling force on the safety belt due to such change of motion.

13. Safety belt as claimed in claim 12 including a G-sensitive switch and a pyrotechnic pressure generating means in communication with a belt portion on one side of said clamping device and igniteable by said switch.

* * * * *